W. H. WELCH.
ELECTRICAL CUT-OUT.
APPLICATION FILED MAR. 1, 1920.

1,400,470.

Patented Dec. 13, 1921.
2 SHEETS—SHEET 1.

Inventor:
Walter H. Welch.
by Wilkinson & Giusta.
Attorneys.

W. H. WELCH.
ELECTRICAL CUT-OUT.
APPLICATION FILED MAR. 1, 1920.

1,400,470.

Patented Dec. 13, 1921.
2 SHEETS—SHEET 2.

Inventor
Walter H. Welch
by Wilkinson + Giusta
Attorneys

UNITED STATES PATENT OFFICE.

WALTER HENRY WELCH, OF BISHOPSTON, BRISTOL, ENGLAND, ASSIGNOR TO HARVEY FROST & COMPANY, LIMITED, OF LONDON, ENGLAND.

ELECTRICAL CUT-OUT.

1,400,470. Specification of Letters Patent. Patented Dec. 13, 1921.

Application filed March 1, 1920. Serial No. 362,177.

*To all whom it may concern:*

Be it known that I, WALTER HENRY WELCH, subject of the King of England, residing at Bishopston, Bristol, in the county of Gloucester, England, have invented certain new and useful Improvements in Electrical Cut-Outs, of which the following is a specification.

This invention is for improvements in or relating to electrical cut-outs and has for its object to provide means whereby a cut-out which is closed in some piece of apparatus, may be adjusted at will from without such apparatus to act repetitively or not, according to requirements. The invention is particularly applicable to use with electrically heated portable vulcanizers for tire repairs.

According to this invention, an electrical cut-out which is boxed in and wherein a resilient contact-arm is moved away from its coöperating contact by means which effect the cutting out, is characterized by the cut-out being made repetitive or not at will by a bolt which extends through, and is slidingly mounted in, the wall of the casing so that it can be hand-operated from without and which is made to bear at its inner end by a yielding control against the operative end of the contact-arm so that it can slide under the same when it is moved away from its fellow-contact, and thus out of the path of the bolt, and characterized also by means whereby the bolt when withdrawn by hand can be locked back from its operative position, for example by giving it a partial turn, for the purpose of preventing repetitive action.

In the accompanying drawings which illustrate one method of carrying out this invention:—

The same letters indicate the same parts throughout the several views.

The cut-out illustrated comprises a resilient tongue A which makes contact with a part B at its free end. This tongue is forced away from the contact B by the cutting-out means when this is operative but rests upon the same when the cutting-out means is not operative. The cutting-out means is a pressure-operated diaphragm.

The cut-out is inclosed in a boxing or casing C and sliding in one wall of the said casing is a bolt D whose end butts against the free end of the tongue A. A spring $D^1$ yieldingly holds the bolt against the end of the tongue and the bolt carries a cross-pin $D^2$ which works in a slot $C^2$ in a boss $C^1$ on the wall of the casing; the bolt has an operating knob $D^3$.

Figure 2:
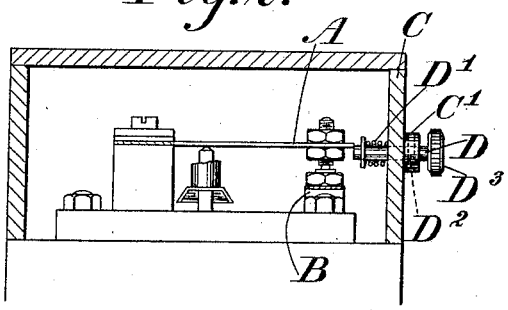
Fig. 2 is a section on the line 2—2 of Fig. 1.

When the bolt is in the position shown in Fig. 2 with the cross-pin $D^2$ slidable in the slot in the boss $C^1$, the cut-out is not repetitive in action. As soon as the tongue A is raised to break the contact with the part B, the bolt will shoot beneath the end of the tongue and prevent it returning so that it cannot again make contact with the part B. This non-repetitive action is of particular service in vulcanizers where the vulcanizer is applied to the work and can then be left, because as soon as the required temperature is reached, the cut-out will operate and when the apparatus begins to cool down the electric circuit will not again be closed, so that this becomes a timing-device whereby the part to be vulcanized can first be gradually raised to the proper temperature and then allowed to cool down again, the whole operation taking long enough to properly vulcanize the part without the operator having to wait until the vulcanizing is finished.

Figure 1:
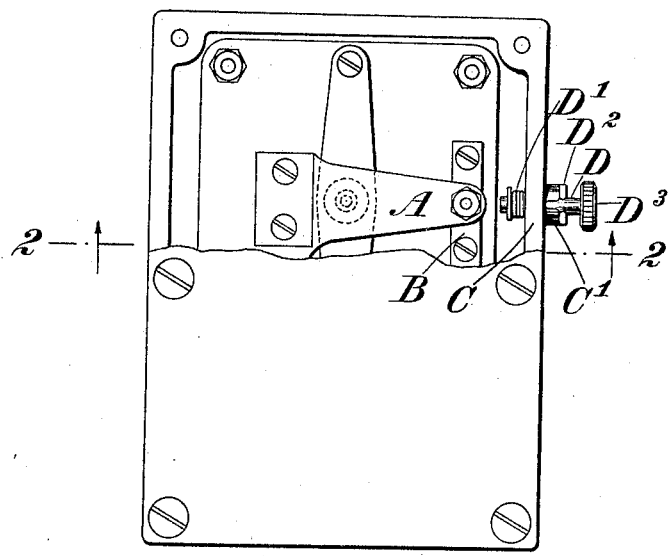
Figure 1 is a plan of the cut-out with its sliding bolt.
Figure 3:
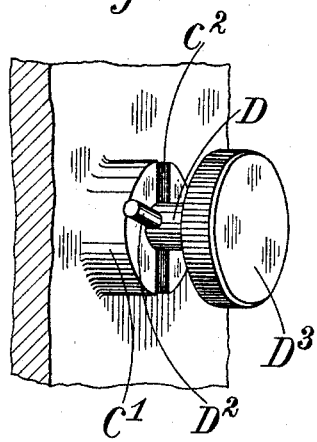
Fig. 3 is an enlarged perspective view of a detail.

On the other hand, by pulling the bolt out by means of the knob $D^3$ and giving it a partial turn, the cross-pin can be brought into the position shown in Figs. 1 and 3, in which it is situated across the slot $C^2$ instead of in the same so that the operative end of the bolt is kept away from the end of the cut-out arm A, and thus the cut-out becomes repetitive in action. This is serviceable when the operator wants to continually use the apparatus and is attendant upon the work during each operation.

It will thus be seen that by this means a cut-out for a vulcanizer is provided, which can be used either to guard against the temperature rising above a predetermined limit while the apparatus is in continuous use, or by adjustment, which can be effected from outside the apparatus, the same cut-out can be made to operate upon a time basis, that is, it will allow the temperature to rise to a predetermined limit and then cut-out permanently and thus allow the parts to cool down, which will always occupy a period of time sufficient to insure proper vulcanization.

By having all the parts of the cut-out boxed in and only the adjusting bolt projecting outside, there is nothing which can be easily damaged, and yet ready adjustment for repetitive or other operation can be effected.

What I claim as my invention and desire to secure by Letters Patent is:—

The combination of a casing, a respectively-operable electrical cut-out comprising a contact piece and a resilient contact arm arranged to coöperate therewith mounted in said casing, a manually operable spring controlled bolt mounted independently of said contact piece and said contact arm to slide in the wall of the casing and arranged to move under the contact arm and thereby hold the cut-out open, and means for retaining said bolt in its inoperative position in which it is withdrawn from said contact arm.

In testimony whereof I affix my signature.

WALTER HENRY WELCH.